United States Patent [19]
Flandoli

[11] 3,880,760
[45] Apr. 29, 1975

[54] CONNECTOR DEVICE FOR COIL-TYPE DIALYSER
[75] Inventor: Romano Flandoli, Mirandola, Italy
[73] Assignee: Sandoz Ltd. (a/k/a Sandoz AG), Basel, Switzerland
[22] Filed: June 7, 1973
[21] Appl. No.: 367,969

[30] Foreign Application Priority Data
June 8, 1972  Italy.................................. 25428/72

[52] U.S. Cl................................. 210/321; 210/494
[51] Int. Cl............................................ B01d 31/00
[58] Field of Search ................ 210/22, 23, 321, 494

[56] References Cited
UNITED STATES PATENTS
3,397,790  8/1968  Newby et al.................... 210/494 X
3,508,662  4/1970  Miller............................. 210/494 X Primary Examiner—Frank A. Spear, Jr.
Attorney, Agent, or Firm—Gerald D. Sharkin; Robert S. Honor; Walter F. Jewell

[57] ABSTRACT

The invention concerns a novel apparatus for connecting an open-ended flattened membrane tube of a coil-type dialyser to an open end of a blood conduit, which comprises a base section, a cover section shaped to mate with the base section, the base section and cover section together defining a recess between them to receive the open end of the blood conduit, and a seal operable between the base section and cover section to seal the open end of the membrane tube with the open end of the blood conduit within the membrane tube.

6 Claims, 3 Drawing Figures

3,880,760

CONNECTOR DEVICE FOR COIL-TYPE DIALYSER

This invention relates to a connector device for a coil-type dialyser. More particularly, the invention concerns an apparatus for connecting an open-ended flattened membrane tube of a coil-type dialyser to an open end of a blood conduit.

In accordance with the invention, there is provided an apparatus for connecting an open-ended flattened membrane tube of a coil-type dialyser to an open end of a blood conduit, which comprises a base section, a cover section shaped to mate with the base section, the base section and cover section together defining a recess between them to receive the open end of the blood conduit, and a seal operable between the base section and cover section to seal the open end of the membrane tube with the open end of the blood conduit within the membrane tube.

The above-mentioned base section and cover section may together form a core for the coil-type dialyser, about which the flattened membrane tube and membrane support material (such as conventionally employed netting) may be spirally wound. Alternatively or additionally, the base section and cover section may together form a hollow cylindrical casing for the coil-type dialyser, within which the flattened membrane tube and membrane support material may be spirally wound.

Base sections and cover sections such as mentioned above may be provided with membrane recesses into which the flattened membrane tube may expand when blood is passed through the membrane envelope. Such membrane recesses preferably radiate outwardly from the assembled position taken by the opening in the open end of the blood conduit towards the closed edges of the flattened membrane tube.

The invention will now be described with reference to the accompanying drawings, showing, by way of example, apparatus in accordance with the invention for connecting an open-ended flattened membrane tube of a coil-type dialyser to an open end of a blood conduit.

In the drawings

Figure 1:
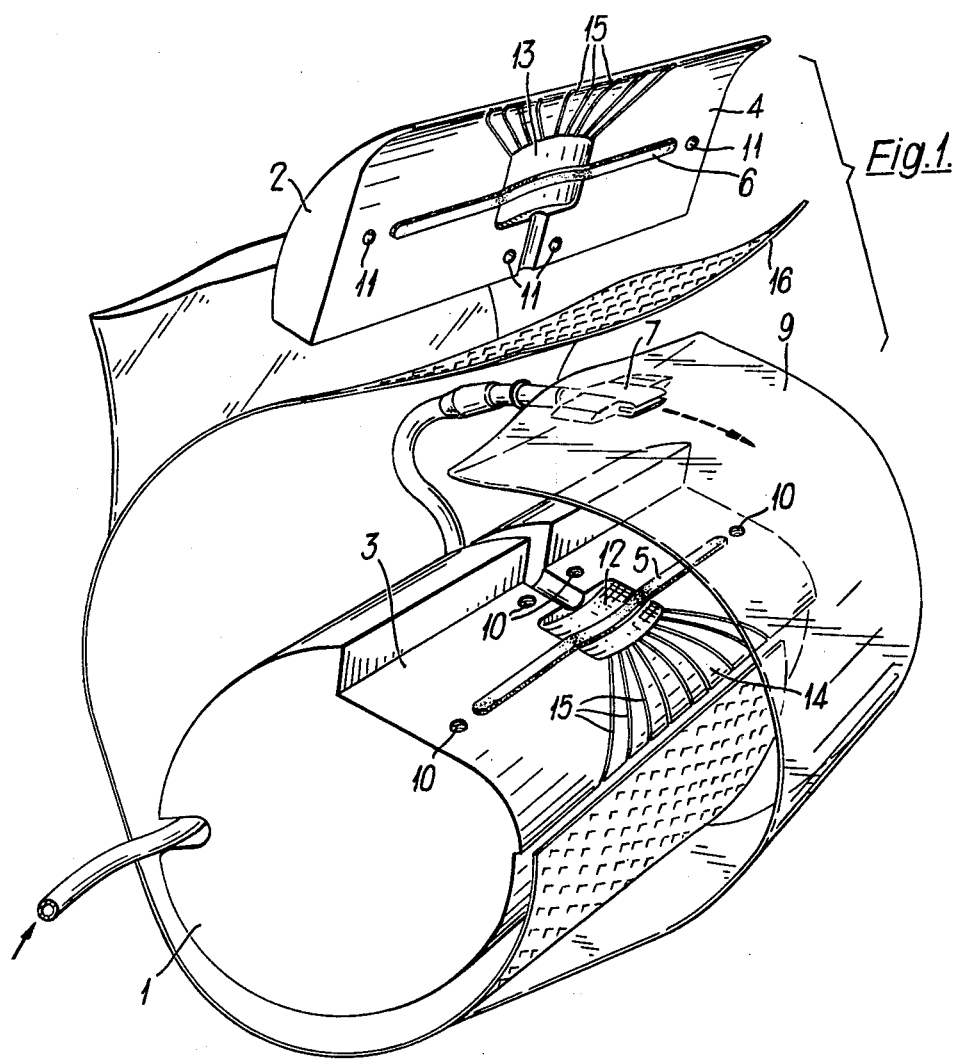
FIG. 1 shows a perspective exploded view of a base section and cover section which together form a core for a coil-type dialyser.

Referring particularly to FIG. 1 of the drawings, reference numeral 1 refers to a core base section and reference numeral 2 to a core cover section shaped to mate together with said core base section over surfaces 3 and 4. The base and cover sections have recesses 12 and 13, so that they together define a recess between them to receive the open end 7 of a blood inlet conduit. Seals 5 and 6 are respectively mounted on the base and cover sections and are operable in conjunction to seal the open end of membrane tube 9 with the open end 7 of the blood inlet conduit within the membrane tube.

The core base section and cover section are provided with membrane recesses 15 radiating outwardly from the assembled position taken by the opening in the open end 7 of the blood inlet conduit towards the closed edges of the flattened membrane tube 9.

Reference numerals 10 and 11 refer to mating apertures in the core base section 1 and cover section 2 into which screws or other securing means may be fitted to secure the cover section to the base section.

Figure 2:
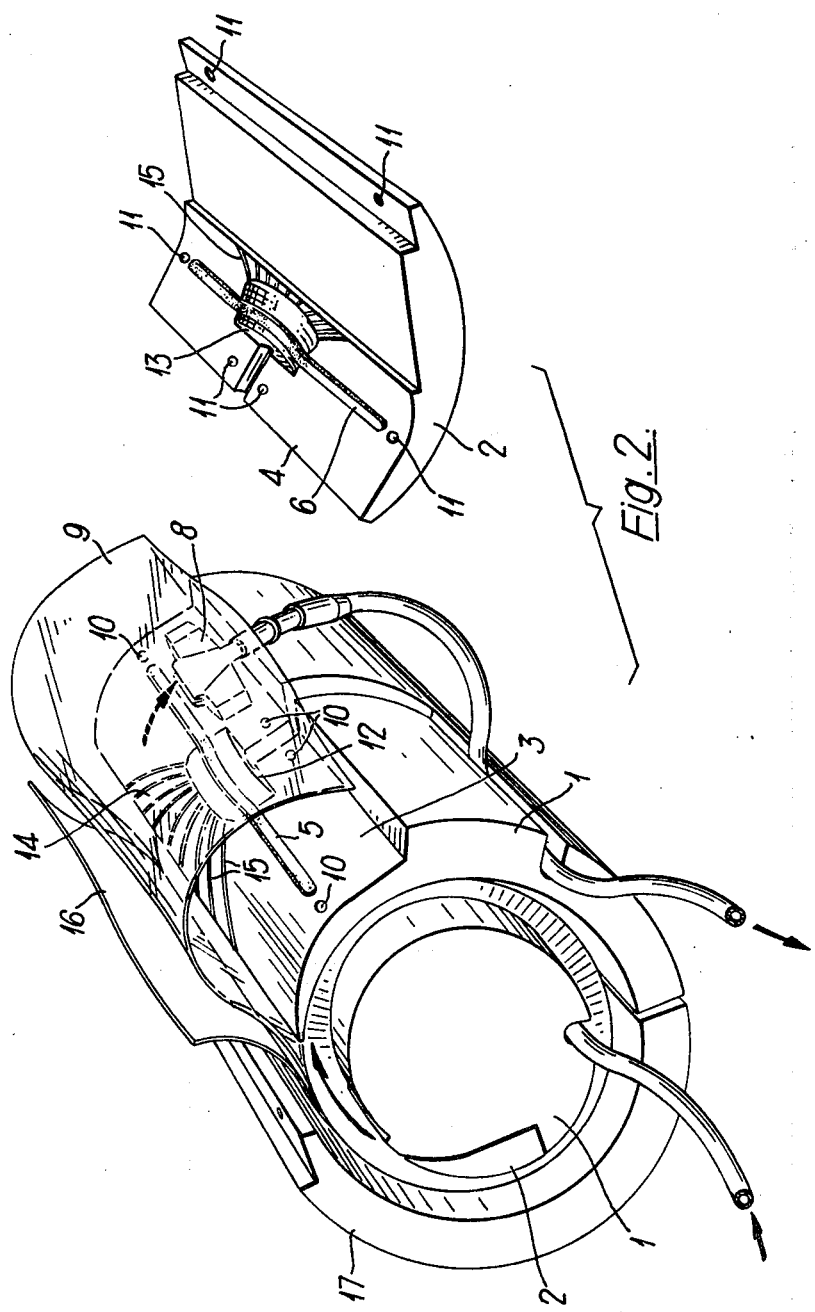
FIG. 2 shows a perspective exploded view of a base section and cover section which together form a hollow cylindrical casing for a coil-type dialyser, the core sections of FIG. 1 being shown in position within the casing.
Figure 3:
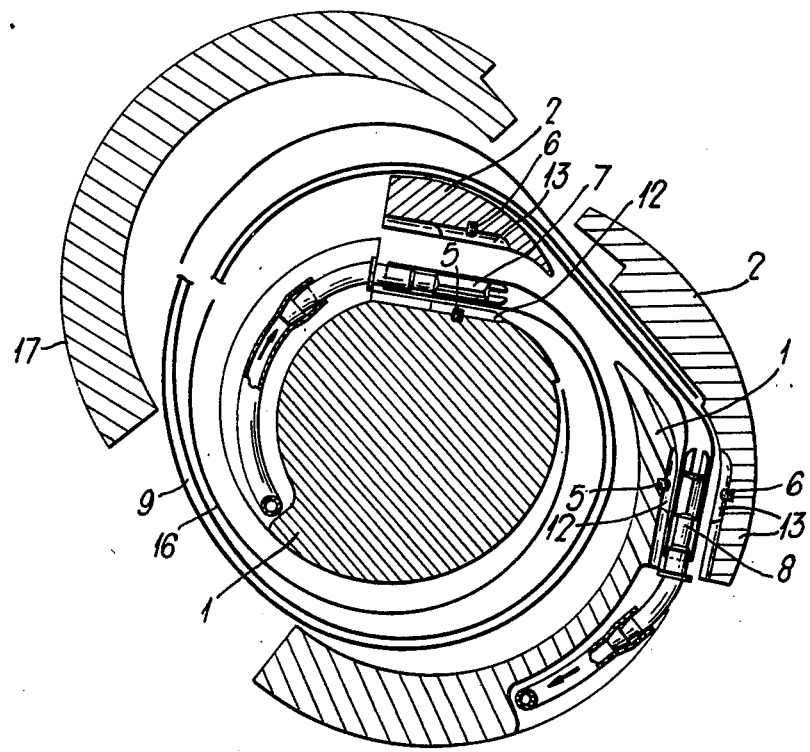
FIG. 3 shows an exploded end elevation of a coil-type dialyser, both the core sections of FIG. 1 and the casing sections of FIG. 2 being shown.

As can more readily be seen from FIGS. 2 and 3, the base section 1 and cover section 2 shown in FIG. 1, together form a core for the coil-type dialyser about which the flattened membrane tube 9 and membrane support material 16 may be spirally wound.

Referring now to FIGS. 2 and 3 of the drawings, the reference numerals essentially refer to integers corresponding to integers of FIG. 1. Thus, FIGS. 2 and 3 refer to a casing base section 1 and casing cover section 2 shaped to mate together with said casing base section over surfaces 3 and 4. The casing base and cover sections have recesses 12 and 13 so that they together define a recess between them to receive the open end 8 of a blood outlet conduit. Seals 5 and 6 are again respectively mounted on the casing base and cover sections and are operable in conjunction to seal the open end of membrane tube 9 with the open end 8 of the blood outlet conduit within the membrane tube.

As with the base section and cover section forming a core for a coil-type dialyser, the casing base section 1 and mating cover section 2 have membrane recesses 15 into which the flattened membrane tube 9 may expand when blood is passed through the membrane tube.

In use, blood is passed into the membrane tube 9 through the open end 7 of the blood inlet conduit, spirally outwardly about the core and out through the open end 8 of the blood outlet conduit. During this operation, dialysate liquid is passed into the space defined between the spirally wound membrane tube 9 by the membrane support material 16.

What is claimed is:

1. Apparatus for connecting an open-ended flattened membrane tube of a coil-type dialyser to an open end of a blood conduit, which comprises a base section, a cover section shaped to mate with the base section, the base section and cover section together form a core about which the flattened membrane tube and membrane support material may be spirally wound, the base section and cover section together further defining a recess between them to receive the open end of the blood conduit, and a seal operable between the base section and cover section to seal the open end of the membrane tube with the open end of the blood conduit within the membrane tube.

2. Apparatus according to claim 1 wherein the base section and cover section are provided with membrane recesses into which the flattened membrane tube may expand when blood is passed through the membrane tube.

3. Apparatus according to claim 1 wherein the membrane recesses radiate outwardly from the assembled position taken by the opening in the open end of the blood conduit towards the closed edges of the flattened membrane tube.

4. Apparatus for connecting an open-ended flattened membrane tube of a coil-type dialyser to an open end of a blood conduit, which comprises a base section, a cover section shaped to mate with the base section, the base section and cover section together form a hollow cylindrical casing within which the flattened membrane tube and membrane support material may be spirally wound, the base section and cover section together further defining a recess between them to receive the open end of the blood conduit, and a sealed operable between the base section and cover section to seal the open end of the membrane tube with the open end of the blood conduit within the membrane tube.

5. Apparatus according to claim 4 wherein the base section and cover section are provided with membrane recesses into which the flattened membrane tube may expand when blood is passed through the membrane tube.

6. Apparatus according to claim 4 wherein the membrane recesses radiate outwardly from the assembled position taken by the opening in the open end of the blood conduit towards the closed edges of the flattened membrane tube.

* * * * *